US012728613B2

(12) United States Patent
Mansuino et al.

(10) Patent No.: US 12,728,613 B2
(45) Date of Patent: Sep. 8, 2026

(54) METHOD FOR MAKING A PACKAGE IN SHEET MATERIAL

(71) Applicant: SOREMARTEC S.A., Senningerberg (LU)

(72) Inventors: Sergio Mansuino, Senningerberg (LU); Andrea Tavella, Senningerberg (LU); Luca Franco, Senningerberg (LU); Maurizio Barello, Senningerberg (LU)

(73) Assignee: SOREMARTEC S.A., Senningerberg (LU)

( * ) Notice: Subject to any disclaimer, the term of this patent is extended or adjusted under 35 U.S.C. 154(b) by 0 days.

(21) Appl. No.: 18/721,036

(22) PCT Filed: Dec. 19, 2022

(86) PCT No.: PCT/IB2022/062473
§ 371 (c)(1),
(2) Date: Jun. 17, 2024

(87) PCT Pub. No.: WO2023/119121
PCT Pub. Date: Jun. 29, 2023

(65) Prior Publication Data

US 2025/0058541 A1 Feb. 20, 2025

(30) Foreign Application Priority Data

Dec. 23, 2021 (IT) ........................ 102021000032465

(51) Int. Cl.
*B31B 50/59* (2017.01)
*B65B 7/28* (2006.01)
(Continued)

(52) U.S. Cl.
CPC .......... *B31B 50/592* (2018.05); *B65B 7/2878* (2013.01); *B65B 25/005* (2013.01); *B65B 47/04* (2013.01); *B31B 2110/20* (2017.08)

(58) Field of Classification Search
CPC ... B31B 50/592; B31B 2110/20; B31B 43/00; B31B 2201/223; B31B 1/25;
(Continued)

(56) References Cited

U.S. PATENT DOCUMENTS 3,746,497 A * 7/1973 Neil ........................ B29C 51/04
425/398
4,143,587 A * 3/1979 Fujii ......................... B32B 5/26
425/408
(Continued)

FOREIGN PATENT DOCUMENTS

DE 3641127 A1 6/1988
EP 2322339 A2 5/2011
(Continued)

OTHER PUBLICATIONS

International Search Report and Written Opinion issued for International Application No. PCT/IB2022/062473 on Jul. 28, 2023, 26 pages.

*Primary Examiner* — Sameh Tawfik
(74) *Attorney, Agent, or Firm* — Rothwell, Figg, Ernst & Manbeck, P.C.

(57) ABSTRACT

Described herein is a method for making a package comprising at least one sheet of packaging material including at least one layer of paper, which is shaped so as to present a hollow portion surrounded by a perimetral portion. The hollow portion of the shaped sheet has a ratio between depth and width higher than 0.39, preferably between 1:1.8 and 1:2.5.

29 Claims, 3 Drawing Sheets

(51) Int. Cl.
*B65B 25/00* (2006.01)
*B65B 47/04* (2006.01)
*B31B 110/20* (2017.01)

(58) Field of Classification Search
CPC ..... B65B 7/2878; B65B 25/005; B65B 47/04; B65B 69/0033; B65B 69/0058
USPC .......................................................... 53/477
See application file for complete search history.

(56) References Cited

U.S. PATENT DOCUMENTS

| | | | | | |
|---|---|---|---|---|---|
| 4,228,121 | A * | 10/1980 | Meadors | B29C 51/082 264/296 |
| 4,514,353 | A * | 4/1985 | Alexander | B29C 51/30 425/398 |
| 4,758,145 | A * | 7/1988 | Hautemont | B29C 51/46 425/398 |
| 4,865,793 | A * | 9/1989 | Suzuki | B65D 17/401 425/117 |
| 4,897,031 | A * | 1/1990 | Weder | B65B 25/023 425/388 |
| 5,571,473 | A * | 11/1996 | Fujii | B29C 51/422 264/510 |
| 6,093,460 | A * | 7/2000 | Iwaya | B65D 1/34 493/158 |
| 6,682,675 | B1 * | 1/2004 | Vandangeot | B29C 70/766 264/161 |
| 8,858,858 | B2 * | 10/2014 | Middleton | B29C 45/14336 493/110 |
| 10,647,467 | B1 * | 5/2020 | Tibbets | B31F 1/0038 |
| 12,246,880 | B2 * | 3/2025 | Lee | B29C 51/36 |
| 2012/0118880 | A1 * | 5/2012 | Wnek | B65D 5/4266 220/660 |
| 2019/0381717 | A1 * | 12/2019 | Mansuino | B65B 51/225 |

FOREIGN PATENT DOCUMENTS

| | | | | |
|---|---|---|---|---|
| EP | 3819224 | A1 | 5/2021 | |
| JP | H0948037 | A | 2/1997 | |
| WO | 9928118 | A1 | 6/1999 | |
| WO | 2015082268 | A1 | 6/2015 | |
| WO | WO-2018146577 | A1 * | 8/2018 | B29C 51/082 |
| WO | 2020127147 | A1 | 6/2020 | |

* cited by examiner

METHOD FOR MAKING A PACKAGE IN SHEET MATERIAL

CROSS REFERENCE TO RELATED APPLICATION(S)

This application is a 35 U.S.C. 371 National Phase Entry Application from PCT/IB2022/062473 filed Dec. 19, 2022, which claims priority to Italian Application No. 102021000032465, filed Dec. 23, 2021. The entirety of the disclosures of the above-referenced applications are incorporated herein by reference.

BACKGROUND OF THE INVENTION

Field of the Invention

The present invention relates to a method for making a package in sheet material.

In particular, the method described herein has been developed for making a package that includes at least one sheet of packaging material comprising at least one layer of paper.

In particular, the described herein method envisages subjecting the aforesaid sheet of packaging material to a step of forming in a mould to form on the sheet a hollow portion surrounded by a perimetral portion that extends around the hollow portion.

The method described herein envisages insertion of at least one product into the hollow portion and then coupling of a second sheet of packaging material to the first sheet via an operation of heat-sealing of the two sheets along the perimetral portion of the first sheet.

Description of the Related Art

Already known in the art are methods for forming in a mould a sheet of packaging material comprising at least one layer of paper. For instance, the document WO2015/082268A1 describes a method for forming a sheet of paper in which the sheet is pushed into a mould cavity by way of a forming member while it is engaged by a withholding member along a region thereof arranged around the mould cavity so that the sheet will enter the mould cavity as a result of two combined actions, represented by sliding of the sheet with respect to the withholding member and deformation by stretching of the sheet itself.

In this context, the object of the present invention is to develop a method for making a package as described above that will be able to provide a shaped sheet, comprising at least one layer of paper, characterized by a hollow portion having a ratio between depth and width higher than 0.39, preferably between 1:1.8 and 1:2.5.

In addition, the object of the present invention is to develop a method that will be able to form a shaped sheet in which the folds of the sheet present on the aforesaid hollow portion and perimetral portion project by a stretch of less than or equal to 0.2 mm.

To return to the document WO2015/082268A1, the forming method described therein generates on the sheet a series of folds, which are caused by the fact that, at least for a part of the process, the sheet is inserted into the mould cavity, adapting to the shape of the latter, by simple repositioning of the sheet from the original plane configuration to the three-dimensional configuration imposed by the mould cavity and by the forming member.

The document WO2015/082268A1 points out that the presence of these folds on the aforesaid second peripheral portion of the sheet thus formed constitutes an obstacle to proper execution of an operation of heat-sealing for coupling to the sheet a second sheet of packaging material in order to make a package as described above.

To overcome the above problem, the document WO2015/082268A1 teaches providing on the aforesaid second peripheral portion a coating configured for covering the aforesaid folds and defining a new smooth surface on which to perform the operation of heat-sealing of the second sheet.

BRIEF SUMMARY OF THE INVENTION

In this context, the object of the present invention is, moreover, to develop a method for making a package as described above that will be improved as compared to the prior art referred to, in particular that can do without the coating operation taught in the document WO2015/082268A1.

One or more of the aforesaid objects are achieved via a method according to claim 1.

The claims form an integral part of the teaching provided herein.

BRIEF DESCRIPTION OF THE DRAWINGS

Further characteristics and advantages of the invention will emerge clearly from the ensuing description, with reference to the annexed drawings, which are provided purely by way of non-limiting example and in which.

DETAILED DESCRIPTION OF THE INVENTION

In the ensuing description, various specific are illustrated, details aimed at enabling n in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

Figure 5:
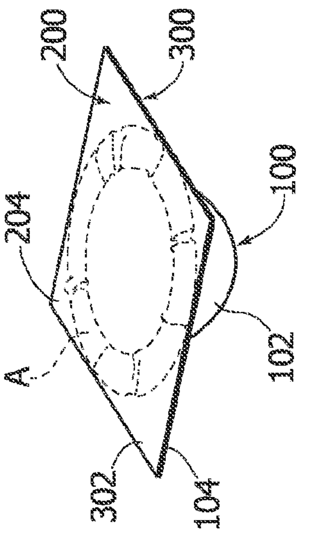
FIG. 5 illustrates an example of package obtained via the method described herein.

With reference to FIG. 5, the method described herein envisages providing, in general, a package 300 comprising at least one sheet 100 of packaging material, including at least one layer of paper, which is shaped so as to present a hollow portion 102 surrounded by a perimetral portion 104, and a second sheet 200 of packaging material, which is coupled to the first sheet 100 so as to close the hollow portion 102 with respect to the outside and is fixed to the perimetral portion 104 of the first sheet as a result of a heat-sealing operation. The perimetral portion 104 defines an angle with the region of the hollow portion proximal thereto that is equal to or greater than 90°, preferably between 90° and 180°.

The packaged product P is inserted into the hollow portion 102 of the first sheet 100 prior to coupling of the first sheet to the second sheet 200.

The method described herein has been developed for applications on foodstuff products, in particular confectionery products, but it is clear that the same teachings provided herein can advantageously be reproduced also for applications on products of some other type.

Figure 1:
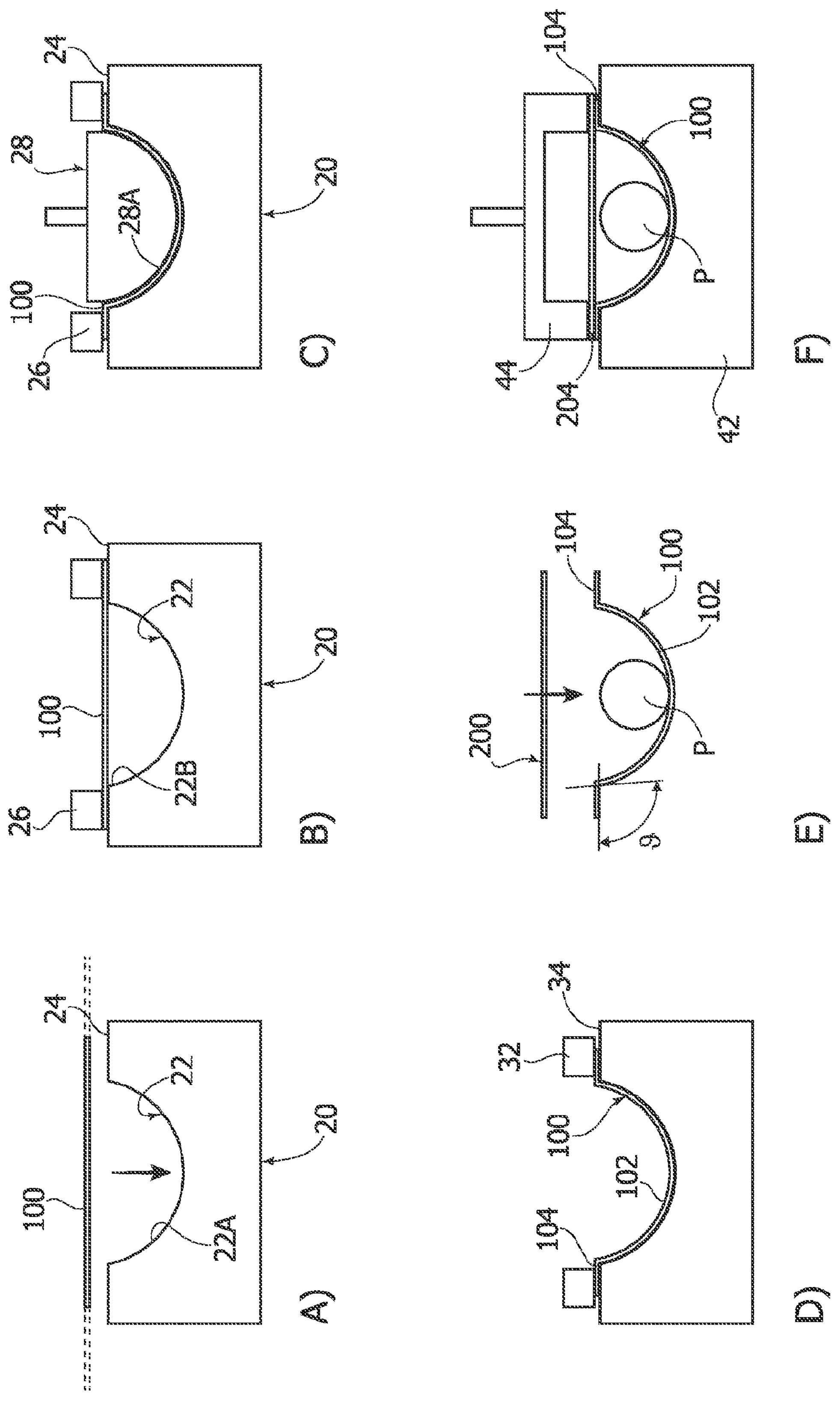
FIG. 1 is a schematic illustration of an example of the method described herein.

With reference now to FIG. 1, the method described herein envisages the use of a sheet 100 of packaging material comprising at least one layer of paper. The layer of paper may present, for example, a substance comprised between 40 $g/m^2$ and 500 $g/m^2$.

Preferably, the sheet 100 comprises a paper that is deformable, in particular extensible (i.e., deformable by lengthening in both of the orthogonal directions of the plane of the sheet), according to an amount greater than 1%, preferably below 10% (for both of the aforesaid directions). The extensibility of the sheet may, for example, be measured according to the ISO 1924-3 standard.

The sheet 100 may, for example, comprise the paper sold under the commercial name FibreForm® by the Swedish company BillerudKorsnäs AB.

The sheet 100 may comprise one or more additional layers coupled to the layer of paper, preferably at least one inner lining made of heat-sealable material, for example PE.

To return to FIG. 1, the method described herein moreover envisages the use of a mould 20 comprising a mould cavity 22 delimited by a forming surface 22A and having a supporting surface 24 that surround the mould cavity 22. The forming surface 22A has, at the top, an edge 22B extending along a pre-set closed path K (see FIG. 2).

The method described herein envisages positioning the sheet 100 over the mould cavity 22 and resting it on the supporting surface 24 (step A of FIG. 1).

A withholding member 26 is then driven to press a portion of the sheet 100, resting on the supporting surface 24, against the surface itself (step B of FIG. 1).

While the withholding member 26 presses the sheet 100 against the supporting surface 24, the method described herein envisages driving a forming member 28 to push the sheet 100 into the mould cavity 22 and bring it into contact with the forming surface 22A (step C of FIG. 1).

The forming member 28 has an operating surface 28A having a shape complementary to that of the forming surface 22A of the mould cavity 22. Consequently, at the end of the stroke of the forming member 28 within the mould cavity 22, the sheet 100 is in contact with the forming surface 22A over the entire area of the latter.

The pressure exerted by the withholding member 26 on the sheet 100 is such that the sheet 100 moves into the mould cavity 22 and comes to cover the forming surface 22A as a result of two combined actions, represented by (i) sliding of sheet 100 with respect to the withholding member 26, and (ii) deformation by stretching of the sheet 100.

Figure 2:
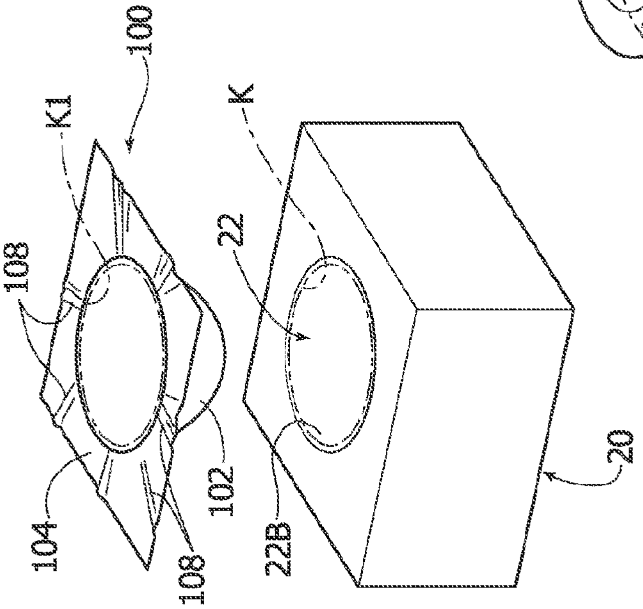
FIG. 2 illustrates a mould used in the method of FIG. 1, and the shaped sheet obtained via the above mould.

The steps referred to above create in the sheet a hollow portion 102, having a shape complementary to that of the forming surface 22A, which is surrounded by a perimetral portion 104, which extends around the hollow portion 102 along a predefined profile K1 corresponding to the path K of the top edge 22B of the mould cavity 22 (see FIG. 2).

As a result of the forming process described above, a series of folds 108 come to be formed on the sheet 100, which are identified by respective folding lines of the sheet 100 oriented in a direction transverse to the predefined profile K of the top edge 22B of the mould cavity 22.

As already mentioned previously, the folds in question are caused by the fact that the sheet 100 passes from the initial plane configuration to the three-dimensional configuration imposed by the mould 20 and by the forming member 28 at least partially as a result of a simple repositioning of the sheet in space.

The action exerted by the withholding member 26 favours formation of the folds 108 on the perimetral portion 104, and also on the hollow portion 102, but limitedly to a region thereof along the predefined profile K1, in the proximity of the perimetral portion 104.

Figure 6:
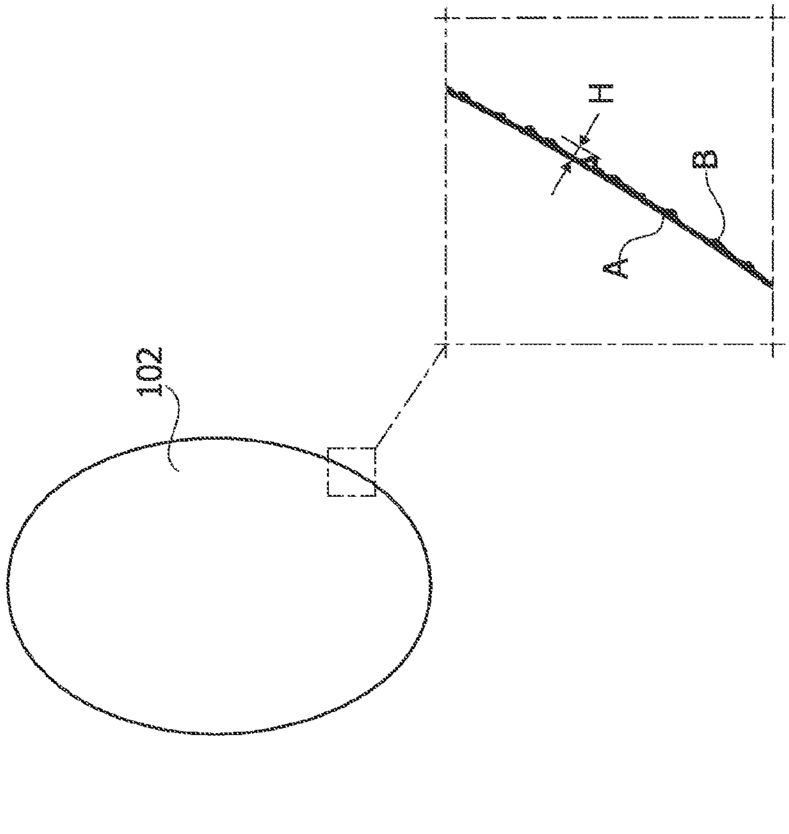
FIG. 6 illustrates an example of detection performed via a laser-scanning device on a sheet obtained via the method described herein.

In one or more preferred embodiments, the folds 108 project from the outer surface of the hollow portion 102 and from the plane of the perimetral portion 104 by a stretch of less than or equal to 0.2 mm. This value can be detected via a laser-scanning device. In this connection, FIG. 6 illustrates an example of detection performed via a device of this type in the region along the portion K1 of the hollow portion 102. In FIG. 6, the profile A represents a theoretical, i.e., ideal, profile, whereas the profile B represents the real profile detected via laser scanning. The projections of the profile B visible in the enlargement represent the aforesaid folds 108.

In one or more preferred embodiments, the mould 20 is made of metal, for example aluminium, and is heated so that its forming surface 22A and/or its supporting surface 24 will be at a pre-set temperature, preferably between 60° C. and 100° C.

In one or more preferred embodiments, like the one illustrated, the withholding member 26 is itself also made of metal, preferably aluminium, and is heated to a pre-set temperature, preferably between 20° C. and 60° C.

The pressure exerted by the withholding member 26 is preferably constant and comprised, once again preferably, between 5 $N/cm^2$ and 20 $N/cm^2$.

In one or more preferred embodiments, the forming member 28 is heated so that its operating surface 28A will be at a pre-set temperature, preferably between 20° C. and 60° C.

In one or more preferred embodiments, the forming member 28 is made of a compliant material. Preferably, the forming member 28 is made of a plastic material, for example polyurethane, even more preferably having a hardness of not less than 60 SH.

The aforesaid heated members and components perform the function of in turn heating the sheet 100 so as to favour deformation thereof by stretching, as described above.

On the other hand, the forming member 28 made of compliant material makes it possible to compensate for possible variations of thickness of the sheet 100 due to formation of the folds 108 during the operation of forming of the sheet.

In one or more preferred embodiments, like the one illustrated, the forming surface 22A of the mould cavity 22 and the operating surface 28A of the forming member 28 are configured for creating a region of the hollow portion 102, extending along the predefined profile K1, that defines, with the perimetral portion 104, an angle equal to or greater than 90°, preferably comprised between 90° and 180°, even more preferably comprised between 90° and 95°.

According to an important characteristic, the method described herein further includes an operation in which a pressure member 32 presses the perimetral portion 104 of the first shaped sheet 100 against a contrast surface 34 so as to subject the perimetral portion 104 of the first sheet 100 to an action of stretching along a path parallel to the predefined profile K1 (step D of FIG. 1).

The present applicant has noted that the aforesaid stretching action enables reduction of the variation of thickness of the perimetral portion 104 due to the presence of the folds 108, with the benefit of enabling heat-sealing of a second sheet of packaging material on the perimetral portion in a proper way and also obtaining hermetic sealing between the two sheets, without the need to apply a levelling coating on the perimetral portion as taught by the document WO/2015/082268A1.

Figure 3:
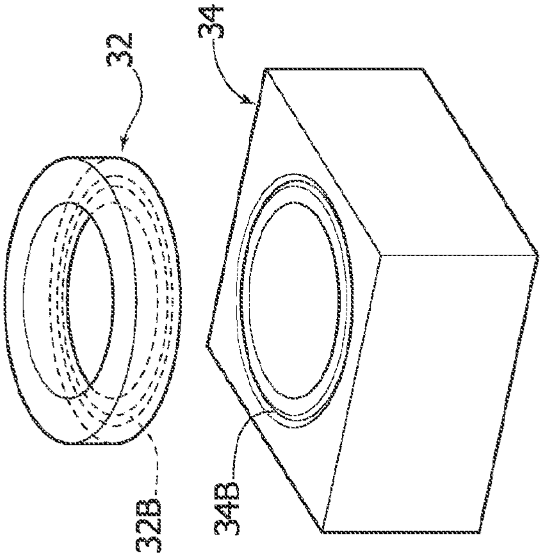
FIG. 3 is a schematic illustration of means used in an embodiment of the method described herein.

With reference to FIG. 3, in a preferred embodiment, provided in the contrast surface 34 is an annular groove 34B that extends in a direction parallel to the predefined profile K1 of the perimetral portion 104 set on the contrast surface, and provided on the pressure member is an annular relief 32 B having a complementary shape that is to penetrate into the annular groove 34B.

In the action of the pressure member against the perimetral portion 104, the annular relief 32B pushes the perimetral portion 104 of the sheet 100 into the annular groove 34B so as to exert an action of stretching of the perimetral portion 104 in a direction transverse to the predefined profile K1.

It should be noted that, in the embodiment illustrated above, provision of the groove 34B and of the relief 32B in the contrast surface 34 and on the pressure member 32, respectively, may also be reversed.

The width and depth of the groove 34B (and accordingly the width and height of the relief 32B) can be identified experimentally with a view to obtaining a region A of the perimetral portion 104 (see FIG. 5), characterized by a variation of thickness of less than 0.2 mm. In the absence of the aforesaid operation of stretching on the perimetral portion sheet formed, it is possible to detect variations of thickness even of the order of the millimetre.

The region A preferably extends along the entire perimetral portion 104 and has a width L that can be selected according to the needs of the specific applications, but that, in general, is such that as to enable fixing to a second sheet 200 of packaging material via a heat-sealing operation. Preferably, the width L is of at least 2 mm.

To return to FIG. 1, following upon the operation carried out by the pressure member 32, the method described herein then envisages the use of a second sheet 200 of packaging material, which preferably itself comprises at least one layer of paper, to close the hollow portion 102 of the shaped sheet 100 (step E of FIG. 1).

The second sheet 200 may be of the same type as the sheet 100 or else of a different type, according to the requirements of the specific applications.

The sheet 200 may be a shaped sheet obtained in the same way as described above with reference to the sheet 100; i.e., it may comprise a hollow portion similar to the portion 102, which is surrounded by a perimetral portion similar to the portion 104. In one or more preferred embodiments, the second sheet 200 may be prepared so as to present a perimetral edge having a shape and/or dimensions corresponding to those of the outer edge of the perimetral portion 104.

The method described herein envisages heat-sealing of the second sheet 200 to the first shaped sheet 100 along the perimetral portion 104.

In particular, the method described herein envisages positioning the first sheet 100 on a supporting member 42 in a condition in which the perimetral portion 104 rests on the supporting member 42 and operating a heat-sealing member 44 to press a corresponding portion 204 of the second sheet 200 against the perimetral portion 104 and heat the portion 204 and/or the perimetral portion 104 to bring about mutual fixing thereof (step F of FIG. 1).

In one embodiment (not illustrated), the heat-sealing member 44 and the supporting member 42 are configured to define also the aforesaid pressure member 32 and the aforesaid contrast surface 34 that are designed to exert an action of stretching of the perimetral portion 104.

In this case, also the portion 204 of the second sheet 200 may be subjected to an action of stretching of the same type.

The present applicant has noted that the aforesaid action of stretching has the effect of favouring a perfect adhesion between the two portions 104, and 204 notwithstanding the presence of the folds 108. In this connection, the present applicant has found experimentally that, via the heat-sealing operation thus conducted, it is possible to perform hermetic sealing between the two sheets 100 and 200.

In one or more preferred embodiments, the supporting member 42 is made of a compliant material.

The present applicant has found that this characteristic makes it possible to perform the aforesaid action of stretching of the portion 104, by the heat-sealing member 44, simply as a result of the variation of thickness created by the presence of the folds 108. In fact, where the sheet is thicker on account of the presence of a fold, the heat-sealing member 44 will press the sheet with a greater force that tends to stretch the sheet in a direction transverse to the line of folding that defines the fold itself.

In one or more preferred embodiments, the supporting member 42 is made of a plastic material, for example polyurethane, preferably having a hardness of not less than 60 SH.

In one or more preferred embodiments, the heat-sealing member 44 is heated to a pre-set temperature, preferably between 120° C. and 180° C. Preferably, the force of pressure exerted by the heat-sealing member 44 is at least equal to 100 N/cm$^2$.

Finally, in one or more preferred embodiments, the method described herein may envisage an operation of cutting of the flange of the package 300 obtained in the way described above, which is formed by the perimetral portion 104 of the shaped sheet 100 and by the corresponding portion 204 of the second sheet 200, to provide a rim 302 with predefined profile (see FIG. 5).

The method described above may be implemented using a sheet 100 and a sheet 200, provided as single sheets, as described above and illustrated in the figures, or else using a sheet 100 and/or a sheet 200, which are provided continuously, for example wound off a reel. In this case, the method will include an operation of cutting to separate the single shaped sheet or the single final package from the aforesaid continuous sheets.

Figure 7:
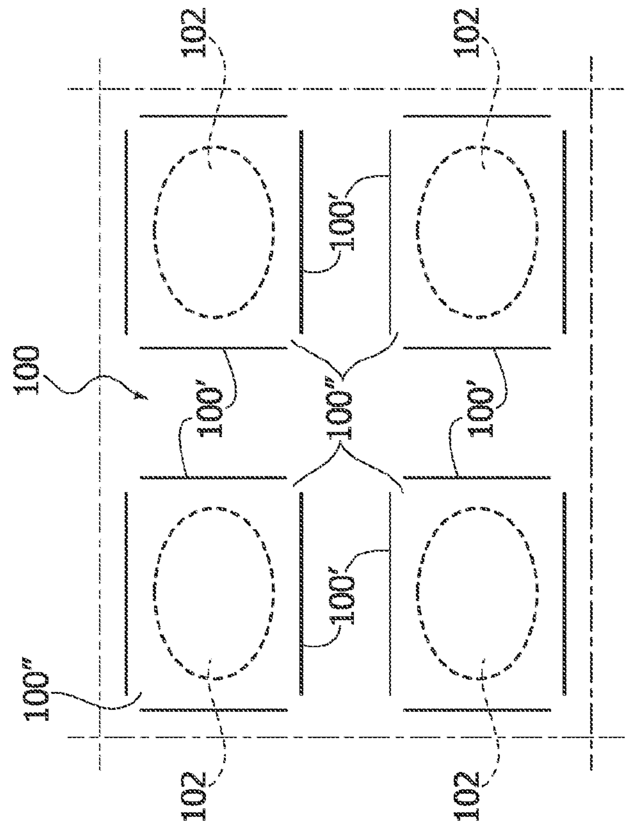
FIG. 7 illustrates a sheet of packaging material used in an embodiment of the method described herein.

In preferred like a embodiment, the one illustrated in FIG. 7, the sheet 100 has a total useful area to obtain a given number of hollow portions surrounded by corresponding perimetral portions, and has a series of cuts 100', for example rectilinear cuts, configured to identify a number of distinct regions of the sheet, equal to the given number, on which to form respective hollow portions surrounded by perimetral portions (represented by a dashed line in FIG. 7 are the hollow portions 102 that are to be made in the individual regions of the sheet). As a result of the aforesaid cuts, these regions are connected to the remaining parts of the sheet only by narrow connecting portions 100" positioned around the individual regions. The present applicant has found that the aforesaid configuration of the sheet makes it possible to provide simultaneously multiple hollow portions 102, surrounded by corresponding perimetral portions 204, without the operation of forming of a hollow portion possibly affecting the operation of forming of another hollow portion.

Figure 4:
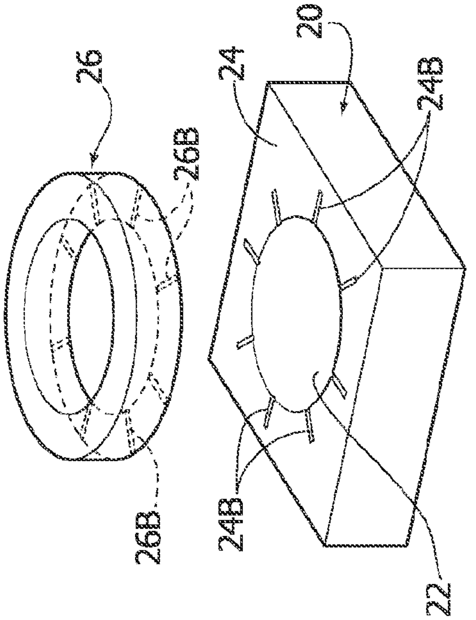
FIG. 4 is a schematic illustration of means used in an embodiment of the method described herein.

With reference now to FIG. 4, this illustrates a mould 20 according to a further embodiment of the method described herein, where made in the supporting surface 24 are a series of grooves 24B distributed around the mould cavity 22 and oriented in directions transverse to the aforesaid profile K. Likewise, the withholding member 26 has a series of reliefs 26B complementary to the grooves 24B and designed to penetrate into the latter to press the sheet 100 against their inner walls. The grooves 24B and the reliefs 26B exert, on the peripheral portion 104 being formed, an action of stretching of the sheet along a path parallel to the profile K, which enables considerable reduction of the number of folds 108 present on the portion 104 of the shaped sheet 100. Provision of the aforesaid grooves and reliefs in the supporting surface 24 and on the withholding member 26, respectively, may even be reversed.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A method for making a package in sheet material, the method comprising the steps of:

providing a sheet (100) of packaging material, comprising at least one layer of paper;

providing a mould (20) comprising a mould cavity (22) delimited by a forming surface (22A) and having a supporting surface (24) that surrounds the mould cavity (22), wherein the forming surface (22A) has a top edge (22B) extending along a pre-set closed path (K);

positioning the sheet (100) over the mould cavity (22) and resting on the supporting surface (24);

driving a withholding member (26) to press against the supporting surface (24) a portion of the sheet (100) resting on the supporting surface (24) itself;

while the withholding member (26) presses the sheet (100) against the supporting surface (24), driving a forming member (28) provided with an operating surface (28A) having a shape complementary to that of the forming surface (22A) of the mould cavity (22) to push the sheet (100) into the mould cavity (22) and bring the sheet (100) into contact with the forming surface (22A) of the mould cavity (20), at the end of the action of the forming member on the sheet there being formed a hollow portion (102) surrounded by a perimetral portion (104) that extends along a predefined profile (K1) corresponding to the pre-set path (K), wherein the forming surface (22A) of the mould cavity (22) and the operating surface (28A) of the forming member (28) are configured for providing a region of the hollow portion (102), extending along the predefined profile (K1), that defines, with the perimetral portion (104), an angle (q) equal to or greater than 90°; and operating a pressure member (32) to press the perimetral portion (104) of the first sheet (100) against a contrast surface (34) so as to subject the perimetral portion (104) of the first sheet (100) to an action of stretching along a path parallel to the predefined profile (K1), wherein provided in the pressure member (32) or in the contrast surface (34) is an annular groove (34B) that extends in a direction parallel to the predefined profile (K1) of the perimetral portion (104) pressed between the pressure member (32) and the contrast surface (34), and provided on the contrast surface (34) or on the pressure member (32) is an annular relief (32B) having a complementary shape that is to penetrate into the annular groove (34B), the method comprising, via said annular relief (32B), pushing the perimetral portion (104) of the sheet (100) into said annular groove (34B) so as to exert an action of stretching of the perimetral portion (104) in a direction transverse to the predefined profile (K1).

2. The method according to claim 1, wherein the pressure exerted by the withholding member (26) is such that, following upon the action of the forming member (28), the sheet (100) moves into the mould cavity (22) and comes to cover the forming surface (22A) as a result of two combined actions, which are i) sliding of the sheet (100) with respect to the withholding member (26), and ii) deformation by stretching of the sheet (100), and wherein obtained on the perimetral portion (104) of the formed sheet are a series of folds (108) identified by respective lines of folding of the sheet that are oriented in a direction transverse to the predefined profile (K1), and wherein also obtained on the hollow portion (102) are a series of folds identified by respective lines of folding of the sheet oriented in a direction transverse to the predefined profile (K1), limitedly to a region along the predefined profile (K1), in the proximity of the perimetral portion (104).

3. The method according to claim 1, wherein the forming surface (22A) and/or the supporting surface (24) of the mould (20) are heated to a pre-set temperature.

4. The method according to claim 3, wherein the pre-set temperature is between 60° C. and 100° C.

5. The method according to claim 1, wherein the forming member (28) is heated to a pre-set temperature.

6. The method according to claim 5, wherein the pre-set temperature is between 20° C. and 60° C.

7. The method according to claim 1, which further includes driving the forming member (28) to press the sheet (100) against the forming surface (22A) by exerting a total force higher than 3000 N.

8. The method according to claim 7, wherein the total force is at least equal to 7000 N.

9. The method according to claim 1, wherein the withholding member (26) is heated to a pre-set temperature.

10. The method according to claim 9, wherein the pre-set temperature is between 20° C. and 60° C.

11. The method according to claim 1, wherein said pressure member (32) operates after the forming member (28).

12. The method according to claim 1, wherein provided in the supporting surface (24) of the mould (20) or in the withholding member (26) are a series of grooves (26B) distributed around the mould cavity (22) and oriented in directions transverse to the pre-set profile (K), and provided on the withholding member (26) or on the supporting surface (24) are a series of reliefs (26B) complementary to the grooves (24B), the method comprising pressing via the reliefs (26B) the sheet (100) into the grooves (24B) so as to exert an action of stretching of the perimetral portion (104) along a path parallel to the predefined profile (K).

13. The method according to claim 1, further comprising:
inserting at least one product into the hollow portion (102);
providing a second sheet (200) of packaging material;
heat-sealing the second sheet (200) to the first sheet (100) that has been formed and contains the at least one product in the hollow portion (102).

14. The method according to claim 13,
wherein heat-sealing the second sheet (200) to the first sheet (100) includes:
providing a supporting member (42) and positioning the first sheet (100) in a condition where the perimetral portion (104) rests on the supporting member (42);
operating a heat-sealing member (44) to press a corresponding portion (204) of the second sheet (200) against the perimetral portion (104) of the first sheet and heating the corresponding portion (204) of the second sheet (200) and/or the perimetral portion (104) of the first sheet (100) to bring about fixing between the two portions.

15. The method according to claim 14, wherein said pressure member is said heat-sealing member (44) and said contrast surface is defined by said supporting member (42).

16. The method according to claim 15, wherein the supporting member (42) is compliant and wherein the heat-sealing member (44) presses the second sheet and the perimetral portion of the sheet against the compliant supporting member so that, where there is a variation of thickness on the perimetral portion (104) of the sheet created by the presence of folds (108), an action of stretching of the perimetral portion (104) is brought about along a path parallel to the predefined profile (K1) and/or in a direction transverse thereto.

17. The method according to claim 16, wherein the supporting member (42) is made of compliant material.

18. The method according to claim 17, wherein the compliant material has a hardness of not less than 60 SH.

19. The method according to claim 1, wherein the first sheet (100) or both the first sheet (100) and the second sheet (200) comprises/comprise a layer of extensible paper.

20. The method according to claim 1, wherein the forming surface (22A) of the mould cavity (22) and the operating surface (28A) of the forming member (28) are configured for providing a region of the hollow portion (102), extending along the predefined profile (K1), that defines, with the perimetral portion (104), an angle (q) equal to or greater than 90°.

21. The method according to claim 20, wherein the angle (q) is comprised between 90° and 95°.

22. The method according to claim 1, wherein providing a sheet (100) includes providing a sheet having a total useful area for forming a given number of hollow portions surrounded by corresponding perimetral portions, and wherein the sheet (100) has a series of cuts configured to identify a number of distinct regions of the sheet, equal to the given number, on which to form respective hollow portions surrounded by perimetral portions and which are connected to the remaining parts of the sheet only by narrow connection portions positioned around the individual regions.

23. A package obtained via a method according to claim 1, wherein the hollow portion (102) of the sheet (100) formed has a ratio between depth and width higher than 0.39.

24. Package according to claim 23, wherein the folds of the sheet present on the hollow portion (102) project from the outer surface of the hollow portion (102) by a stretch (H) of less than or equal to 0.2 mm.

25. The package according to claim 23, wherein the folds of the sheet present on the perimetral portion (104) project from the plane of the perimetral portion (104) by a stretch of less than or equal to 0.2 mm.

26. The package according to claim 23, wherein the perimetral portion (104) defines an angle (q) with the region of the hollow portion (102) extending along the predefined profile (K1) that is equal to or greater than 90°.

27. The package according to claim 26, wherein the angle (q) is comprised between 90° and 95°.

28. A package obtained via a method according to claim 23, wherein the ratio between depth and width is between 1:1.8 and 1:2.5.

29. The method according to claim 1, wherein the angle (q) is comprised between 90° and 180°.

* * * * *